(12) United States Patent
Horiuchi

(10) Patent No.: US 7,826,091 B2
(45) Date of Patent: Nov. 2, 2010

(54) IMAGE PROCESSING APPARATUS, INFORMATION PROCESSING APPARATUS, IMAGE PROCESSING METHOD AND IMAGE PROCESSING SYSTEM

(75) Inventor: Yoshimine Horiuchi, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 562 days.

(21) Appl. No.: 11/580,164

(22) Filed: Oct. 13, 2006

(65) Prior Publication Data

US 2007/0086073 A1 Apr. 19, 2007

(30) Foreign Application Priority Data

Oct. 18, 2005 (JP) ............... 2005-303290

(51) Int. Cl.
| H04N 1/60 | (2006.01) |
| H04N 1/40 | (2006.01) |
| H04N 1/387 | (2006.01) |
| G06F 3/12 | (2006.01) |
| G06K 15/00 | (2006.01) |
| G03G 15/00 | (2006.01) |

(52) U.S. Cl. .............. 358/1.9; 358/1.15; 358/1.18; 358/1.12; 358/1.13; 358/448; 358/453; 358/538; 399/75; 399/81; 399/83; 399/85; 399/362; 399/408

(58) Field of Classification Search .......... 358/527, 358/1.18, 1.15, 1.14, 1.12, 1.5, 1.9, 1.16, 358/434, 401, 118, 452, 1.1, 1.11, 1.13, 448, 358/453, 538; 715/527, 530, 517, 526; 382/317, 382/292, 193, 309, 295, 306; 399/15, 408, 399/75, 81, 83, 85, 362; 345/619, 629

See application file for complete search history.

(56) References Cited

U.S. PATENT DOCUMENTS

| 5,321,475 | A | 6/1994 | Horiuchi et al. |
| 5,907,319 | A | 5/1999 | Hashimoto et al. |
| 6,115,510 | A | 9/2000 | Koga |
| 6,285,842 | B1 | 9/2001 | Katamoto et al. |
| 6,473,539 | B1 | 10/2002 | Koga |
| 6,876,463 | B2 * | 4/2005 | Livingston ............ 358/1.15 |
| 6,911,992 | B2 * | 6/2005 | Bronstein et al. ........ 345/629 |
| 6,927,865 | B1 * | 8/2005 | Kujirai et al. ........... 358/1.12 |
| 7,102,774 | B2 * | 9/2006 | White .................. 358/1.15 |
| 2003/0197894 | A1 * | 10/2003 | Miyamoto et al. ...... 358/1.18 |
| 2005/0088709 | A1 | 4/2005 | Kizaki et al. |
| 2007/0143671 | A1 * | 6/2007 | Paterson et al. .......... 715/527 |

FOREIGN PATENT DOCUMENTS

| JP | 10-297057 | 11/1998 |
| JP | 2001-51814 | 2/2001 |

(Continued)

*Primary Examiner*—Charlotte M Baker
(74) *Attorney, Agent, or Firm*—Oblon, Spivak, McClelland, Maier & Neustadt, L.L.P.

(57) ABSTRACT

An image processing apparatus has a printing function. A preview original-image creation part creates an original image for preview based on print data. A preview parts-image creation part creates a parts image for preview peculiar to each equipment. A preview image synthesis part synthesizes a preview image from the original image for preview and the parts image for preview. A preview image retaining part retains the preview image.

16 Claims, 17 Drawing Sheets

FOREIGN PATENT DOCUMENTS

| | | |
|---|---|---|
| JP | 2002-196901 | 7/2002 |
| JP | 2003-76512 | 3/2003 |
| JP | 2004-77616 | 3/2004 |
| JP | 2005-14328 | 1/2005 |
| JP | 2005-63243 | 3/2005 |

* cited by examiner

IMAGE PROCESSING APPARATUS, INFORMATION PROCESSING APPARATUS, IMAGE PROCESSING METHOD AND IMAGE PROCESSING SYSTEM

BACKGROUND OF THE INVENTION

1. Field of the Invention

The present invention generally relates to image processing techniques and, more particularly, to an information processing apparatus such as an image processing apparatus, an image processing method and image processing system, which handle a preview screen image.

2. Description of the Related Art

In an image processing system in which a host personal computer (host PC) as an example of an information processing apparatus and a multi-function peripheral machine (MFP) as an example of an image processing apparatus are communicably connected with each other, there is a system having a preview function to check an output result according to a preview image displayed on a screen of the host PC before sending a print request from the host PC to the MFP.

Usually, such a preview function is provided in software of the host PC. Thus, according to the conventional preview function, an actual output result may differ slightly from the preview image. Specifically, there is a case in which an actual output result differs slightly from a preview image due to differences in resolution and color between the MFP and the host PC.

Patent Document 1 discloses prevention of an actual output result from differing slightly from a preview image by causing a host PC to display a preview image which is created on a printer side in consideration of a printing function.

Patent Document 1: Japanese Laid-Open Patent Application No. 2003-76512.

Among recent MFPs, there is one provided with a stapling function for stapling a printed matter or a punching function for punching a printed matter besides a printing function. Such an MFP can check an output result according to a preview image but it is difficult to check a relationship between the output result and a stapling position or punching position.

Accordingly, in a conventional MFP, there is a problem that a relationship between an output result and a stapling position or a punching position is different from what an operator intends to even if printing is performed after the operator checked the output result according to a preview image, or there is a problem in that a staple or a punched hole is not prevented from overlapping an image such as characters on a printed matter.

SUMMARY OF THE INVENTION

It is a general object of the present invention to provide an image processing technique in which the above-mentioned problems are eliminated.

A more specific object of the present invention is to provide an image processing apparatus, an information processing apparatus, an image processing method and an image processing system, which is capable of displaying a preview image accurately expressing a finished image of a printed matter.

In order to achieve the above-mentioned objects, there is provided according to one aspect of the present invention an image processing apparatus having a printing function, comprising: a preview original-image creation part that creates an original image for preview based on print data; a preview parts image creation part that creates a parts image for preview peculiar to each equipment; a preview image synthesis part that synthesizes a preview image from the original image for preview and the parts image for preview; and a preview image retaining part that retains the preview image.

In the image processing apparatus according to the present invention, the preview parts-image creation part may create an image of a part formed by a function other than the printing function so as to be the parts image for preview peculiar to each equipment. The preview parts-image creation part may create an image peculiar to each equipment formed by the printing function so as to be the parts image for preview peculiar to each equipment.

The image processing apparatus according to the present invention may further comprise a format conversion part that converts a format of the print data supplied from different supply sources into a unified format.

The preview parts-image creation part may render an image of a part where stapling or punching is applied to be a part formed by a function other than the printing function. The preview parts-image creation part may creates an image of a format or a stamp for synthesis so as to be the image peculiar to each equipment formed by the printing function.

In the image processing apparatus according to the present invention, the preview image retained by the preview image retaining part may be displayed on a display part of the image processing apparatus or an information processing apparatus communicable with the image processing apparatus.

There is provided according to another aspect of the present invention an image processing method of an image processing apparatus having a printing function, comprising: a step of creating an original image for preview based on print data; a step of creating a parts image for preview peculiar to each equipment; a step of synthesizing a preview image from the original image for preview and the parts image for preview; and a step of retaining the preview image.

In the image processing method according to the present invention, the step of creating a parts image for preview peculiar to each equipment may create an image of a part formed by a function other than the printing function so as to be the parts image for preview peculiar to each equipment. The step of creating a parts image for preview peculiar to each equipment may create an image peculiar to each equipment formed by the printing function so as to be the parts image for preview peculiar to each equipment.

The image processing method according to the present invention may further comprise a step of converting a format of the print data supplied from different supply sources into a unified format. The step of creating a parts-image for preview peculiar to each equipment may render an image of a part where stapling or punching is applied to be an image of a part formed by a function other than the printing function.

In the image processing method according to the present invention, the step of creating a parts image for preview may create an image of a format or a stamp for synthesis so as to be the image peculiar to each equipment formed by the printing function.

The image processing method according to the present invention may further comprise a step of causing a display part of the image processing apparatus or an information processing apparatus communicable with the image processing apparatus to display the preview image retained by the step of retaining the preview image.

There is provided according to the present invention an image processing system comprising an image processing apparatus having a printing function and an information processing apparatus communicably connected with the image forming apparatus and making various requests to the image processing apparatus, wherein the image processing apparatus includes: a preview original-image creation part that creates an original image for preview based on print data; a preview parts-image creation part that creates a parts image for preview peculiar to each equipment; a preview image synthesis part that synthesizes a preview image from the original image for preview and the parts image for preview; and a preview image retaining part that retains the preview image, wherein the image processing apparatus includes a control part that requests the preview image of print data to the image processing apparatus and receives the preview image from the image processing apparatus so as to display the received preview image on a display part.

In the image processing system according to the present invention, the preview parts-image creation part may create an image of a part formed by a function other than the printing function so as to be the parts image for preview peculiar to each equipment. The preview parts-image creation part may create an image peculiar to each equipment formed by the printing function so as to be the parts image peculiar for preview to each equipment. The image processing system according to the present invention may further comprise a format converting part that converts a format of the print data supplied from different supply sources into a unified format. The preview parts-image creation part may render an image of a part where stapling or punching is applied to be a part formed by a function other than the printing function. The preview parts-image creation part may create an image of a format or a stamp for synthesis so as to be the image peculiar to each equipment formed by the printing function.

According to the present invention, an image processing apparatus, an information processing apparatus, an image processing method and an image processing system, which is capable of displaying a preview image accurately expressing a finish of a printed matter, can be provided.

Other objects, features and advantages of the present invention will become more apparent from the following detailed description when read in conjunction with the accompanying drawings.

DETAILED DESCRIPTION OF THE PREFERRED EMBODIMENTS

A description will now be given, with reference to the drawings, of embodiments according to the present invention.

Figure 1:
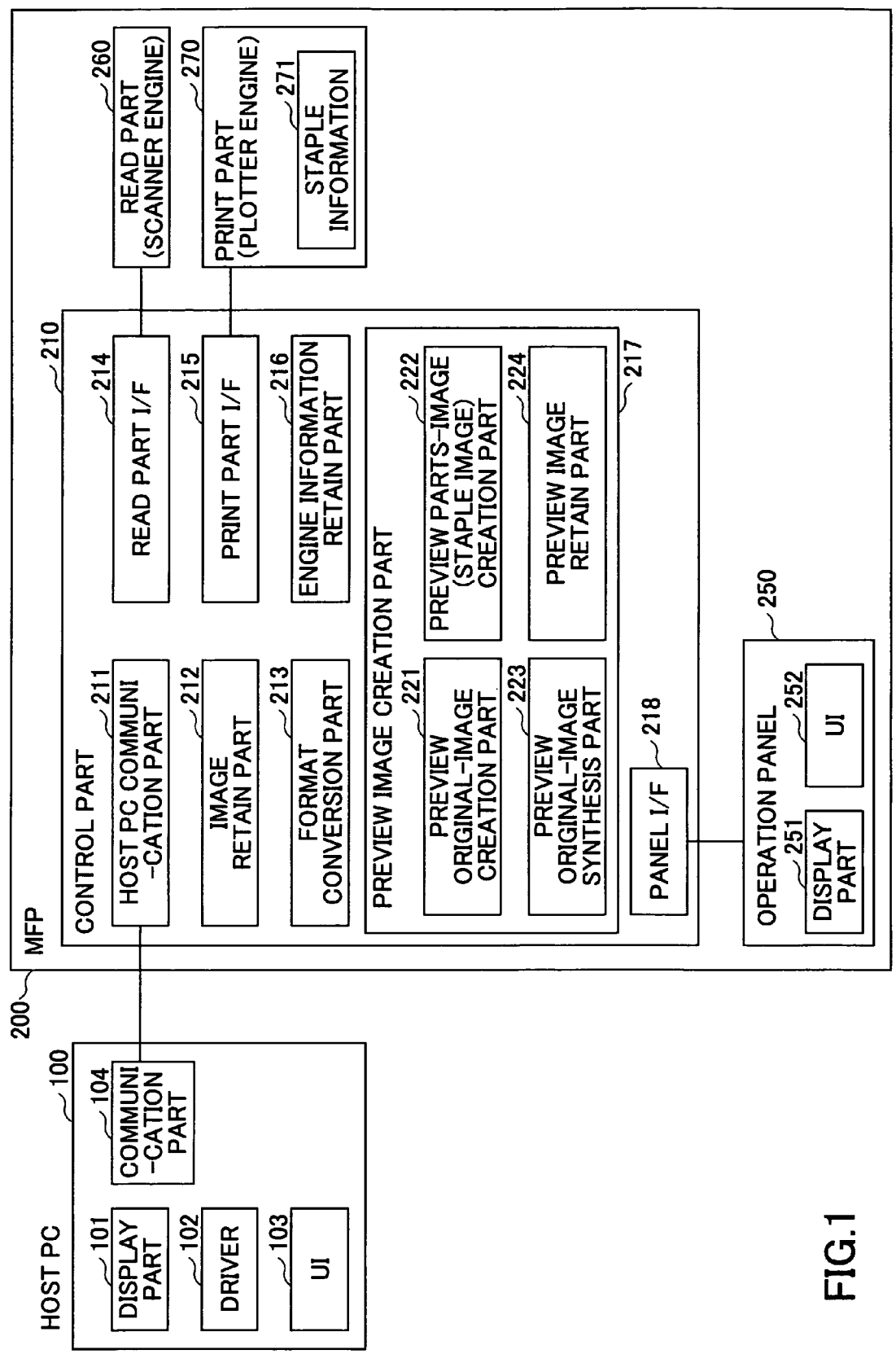
FIG. 1 is a block diagram of an image processing system according to an embodiment of the present invention.

FIG. 1 is a block diagram of an image processing system according to one embodiment of the present invention. In the image processing system shown in FIG. 1, a host personal computer (host PC) as an example of an information processing apparatus and a multi-function peripheral machine (MFP) 200 as an example of an image processing apparatus are communicably connected with each other.

The host PC 100 has a structure comprising a display part 101, a driver 102, a user interface (UI) 103 and a communication part 104. The MFP 200 has a structure comprising a control part 210, a control panel 250, a read part 260 and a print part 270.

The control part 210 has a structure comprising a host PC communication part 211, an image retain part 212, a format conversion part 213, a read part I/F 214, a print part I/F 215, an engine information retain part 216, a preview image creation part 217, and a panel I/F 218.

The preview image creation part 217 has a structure comprising a preview original-image creation part 221, a preview parts-image creation part 222, a preview image synthesis part 223 and a preview image retain part 224.

The control panel 250 comprises a display part 251 and a UI 252. Moreover, the print part 270 comprises staple information 271. It should be noted that processes of each part shown in FIG. 1 will be mentioned later.

Figure 2:
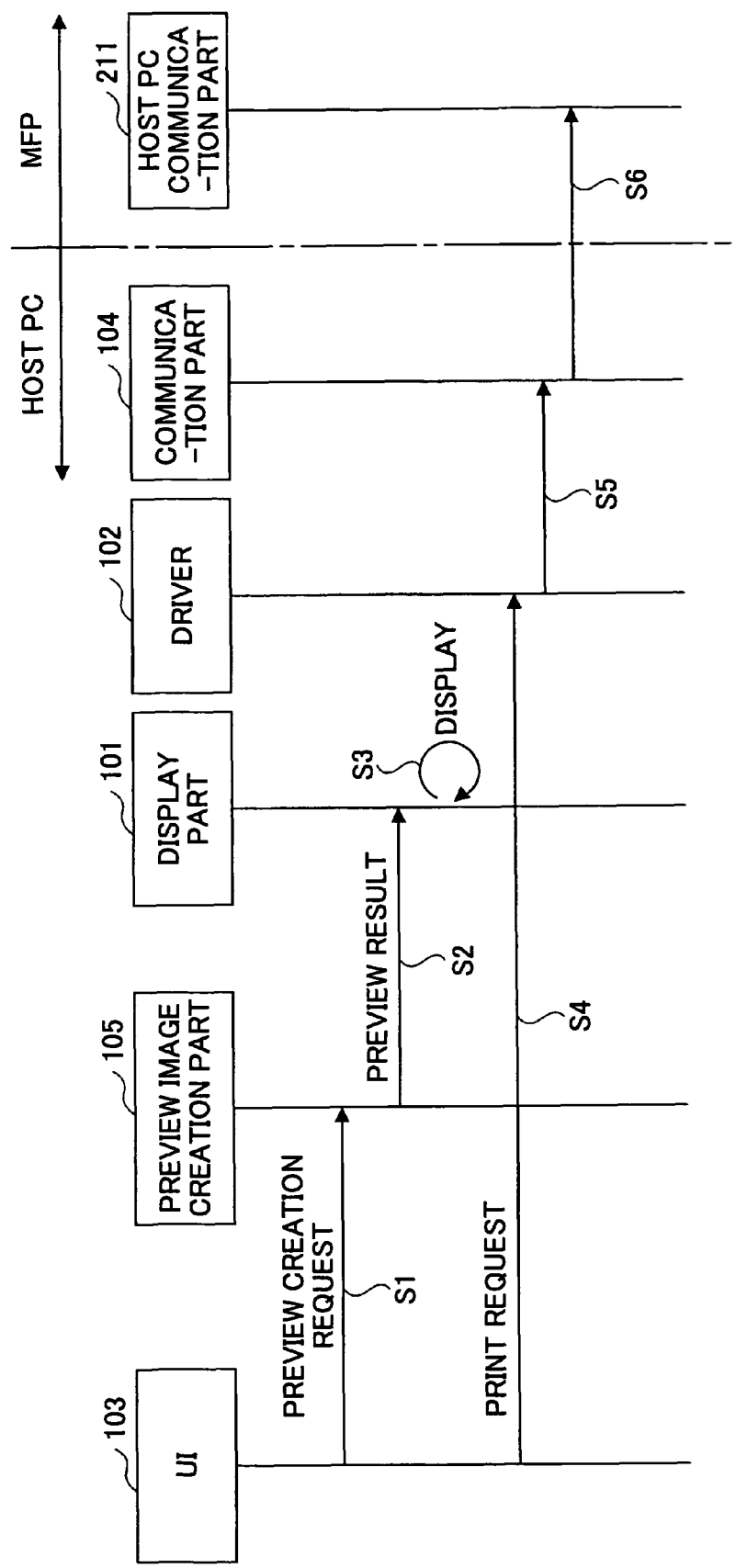
FIG. 2 is a sequence chart of a process procedure of an image processing system different from the image process system according to the present invention.

For the sake of easy understanding of the present invention, a description will be given below, with reference to FIG. 2, of a process of printing according to a request by an operator after displaying a preview image in a conventional image processing system. FIG. 2 is a sequence chart showing a process procedure of an image processing system.

For example, when a preview image display request is made by an operator, the UI 103 of the host PC 100 sends, in step S1, a preview creation request to the preview image creation part 105. The preview image creation part 105 creates a preview image from print data. Then, the process proceeds to step S2 where the preview image creation part 105 sends a preview image to a display part 101 as a preview result.

Then, the process proceeds to step S3 where the display part 101 displays the preview image. The operator checks the preview image displayed on the display part 101, and, if there is no problem, makes a print request through the UI 103. Then, the process proceeds to step S4 where the UI 103 sends the print request to the driver 102. Thus, the driver 102 can send, in steps S5 and S6, the print request to the host PC communication part 211 of the MFP 200 through the communication part 104.

Thus, in the sequence chart shown in FIG. 2, there may be a case where the output result of the MFP 200 slightly differs from the preview image since the preview image is created on the side of the host PC 100.

Figure 3:
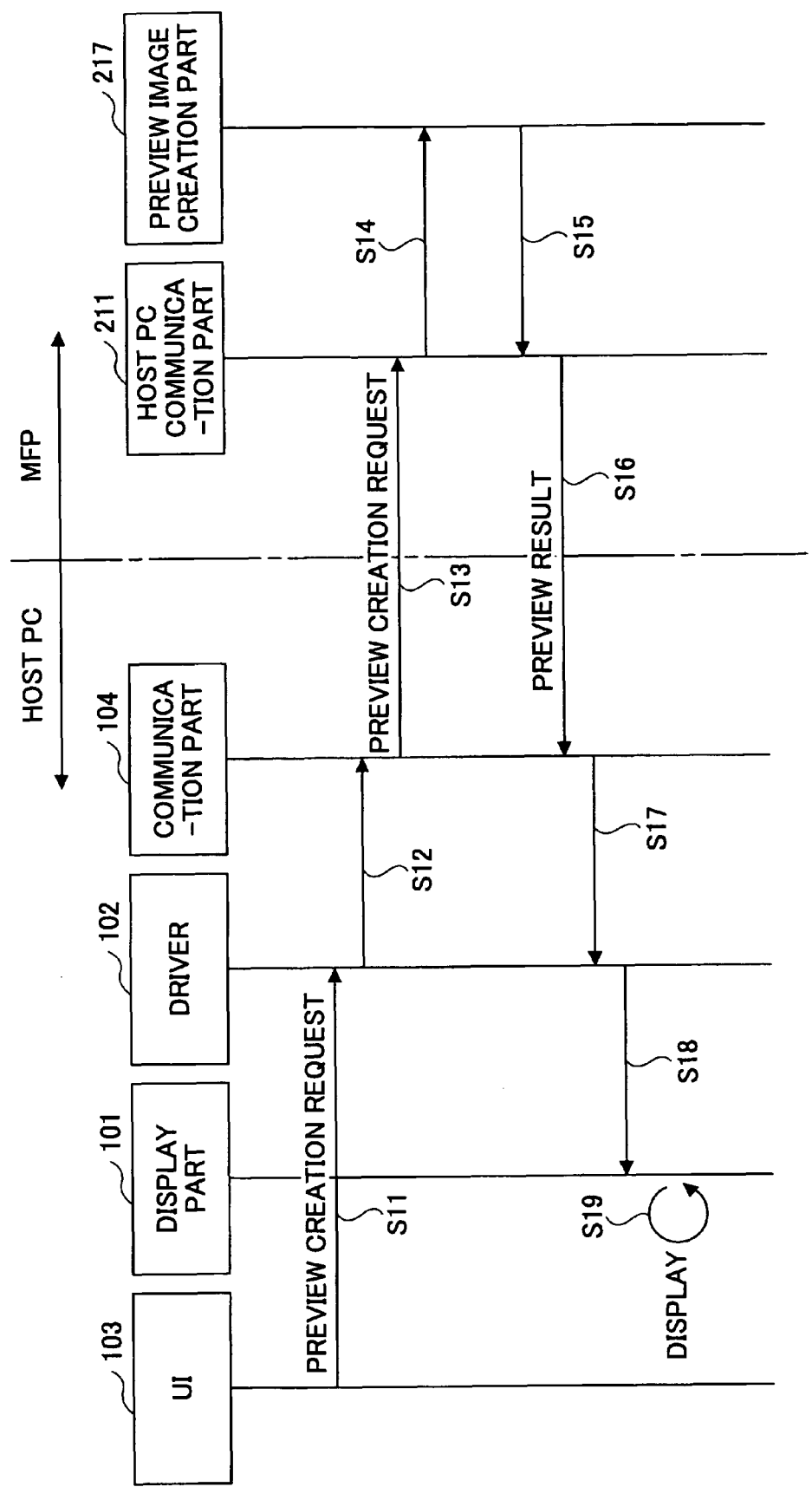
FIG. 3 is a sequence chart of a process procedure of the image processing system according to the present invention.

A description will be now be given, with reference to FIG. 3, of a process of displaying a preview image in the image processing system according to the present invention. FIG. 3 is a sequence chart showing a process procedure of the image processing system according to the present invention. In the sequence chart shown in FIG. 3, a preview image of print data is displayed on the display part 101.

When the a preview image display request is made by an operator, the UI 103 of the host PC 100 sends, in step S11, a preview creation request to the driver 102. Then, the process proceeds to steps S12, S13 and S14 where the driver 102 sends the preview creation request to the preview image creation part 217 through the host PC communication part 211 of the MFP 200.

The preview image creation part 217 creates a preview image from the print data. Then, in steps S15, S16, S17 and S18, the preview picture creation part 217 sends the preview image as a preview result to the display part through the host PC communication part 211, the communication part 104 and the driver 102 of the host PC 100. Then, the process proceeds to step S19 where the display part 101 displays the preview image. The operator can check the preview image displayed on the display part 101.

Thus, according to the sequence chart shown in FIG. 3, the preview image accurately expressing the output result of the MFP 200 can be created since the preview image is created on the side of the MFP 200.

Figure 4:
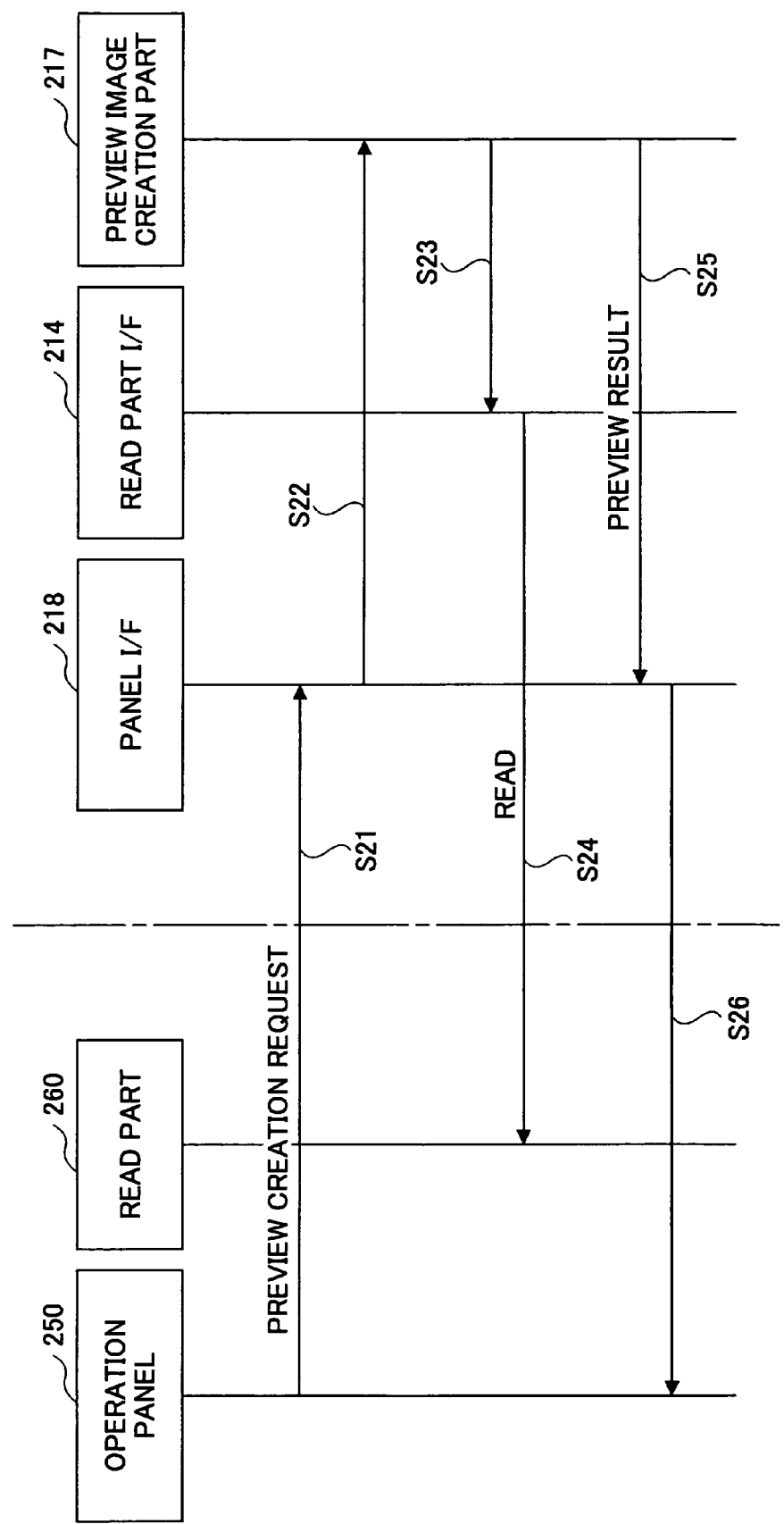
FIG. 4 is a sequence chart of another process procedure of the image processing system according to the present invention.

A description will now be given, with reference to FIG. 4, of another process of displaying a preview image in the image processing system according to the present invention. FIG. 4 is a sequence chart of another example of process procedure of the image processing system according to the present invention. According to the sequence chart of FIG. 4, a preview image of read data acquired by reading by the read part 260 is displayed on the operation panel 250.

For example, when a preview image display request is made by an operator, the operation panel 250 of the MFP 200 sends, in step steps S21 and S22, a preview creation request to the preview image creation part 217 through the panel I/F 218.

The preview image creation part 217 sends, in steps S23 and S24, a read request to the reading part 260 through the read part I/F 214. Then, the process proceeds to step S25 where the preview image creation part 217 creates a preview image from the read data. Then, the process proceeds to step S25 and S26 where the preview image creation part 217 sends the preview image as a preview result to the operation panel 250 through the panel I/F 218. The display part 251 of the operation panel 250 displays the preview image. The operator can check the preview image displayed on the display part 251 of the operation panel 250.

Thus, according to the sequence chart shown in FIG. 4, the preview image accurately expressing the output result of the MFP 200 can be created even if the preview image corresponds to the read data acquired by the read part 260 since the preview image is created on the side of the MFP 200.

As indicated in the sequence chart shown in FIGS. 3 and 4, since the image processing system according to the present invention creates a preview image by the preview image creation part 217 of the MFP 200, creation of the preview picture can be unified.

Furthermore, for the sake of easy understanding of the present invention, a description will be given below, with reference to FIG. 5, of a process of printing after a preview image is displayed in a different image processing system.

Figure 5:
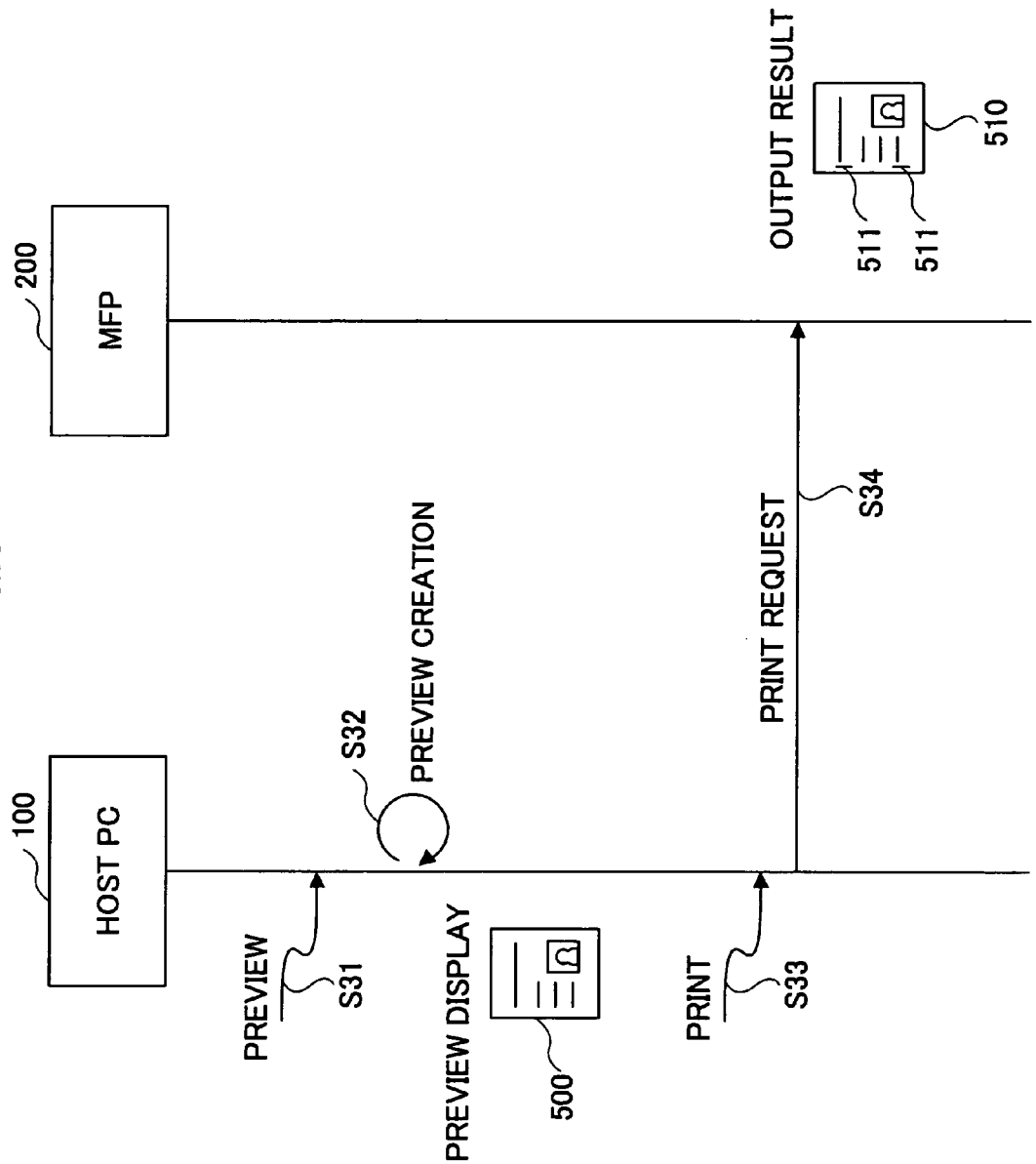
FIG. 5 is a sequence chart of a process by an image processing system different from the image processing system according to the present invention.

FIG. 5 is a sequence chart of a process performed in an image processing system different from the image processing system according to the present invention. The host PC 100 receives, in step S31, a preview image display request from an operator. Then, the host PC 100 creates, in step S32, a preview image 500 from, for example, print data. Then, the host PC 100 displays the preview image 500.

The operator checks the displayed preview image 500. If there is no problem in the preview image 500, the operator sends, in step S33, a print request. Then, the host PC 100 sends, in step S34, the print request to the MFP 200.

The MFP 200 carries out printing based on the print request from the host PC 100, and outputs printed matters 510 as an output result. The printed matters 510 are bound by two a staple 511 at two positions.

Thus, in the image processing system performing the process shown in FIG. 5, the staples 511 of the printed matter 510 at two positions are not expressed in the preview image 500, and it cannot be determined from the preview image 500 whether or not the staples 511 overlap the characters printed on the printed matters. Additionally, a relationship between the orientation of the printed matter 510 and the staples 511 in the image processing system is shown in FIG. 5. It should be noted that the above-mentioned problem due to difference between the preview image 500 and the printed matter 510 may occur when punching is applied to the printed matter 510.

Figure 6:
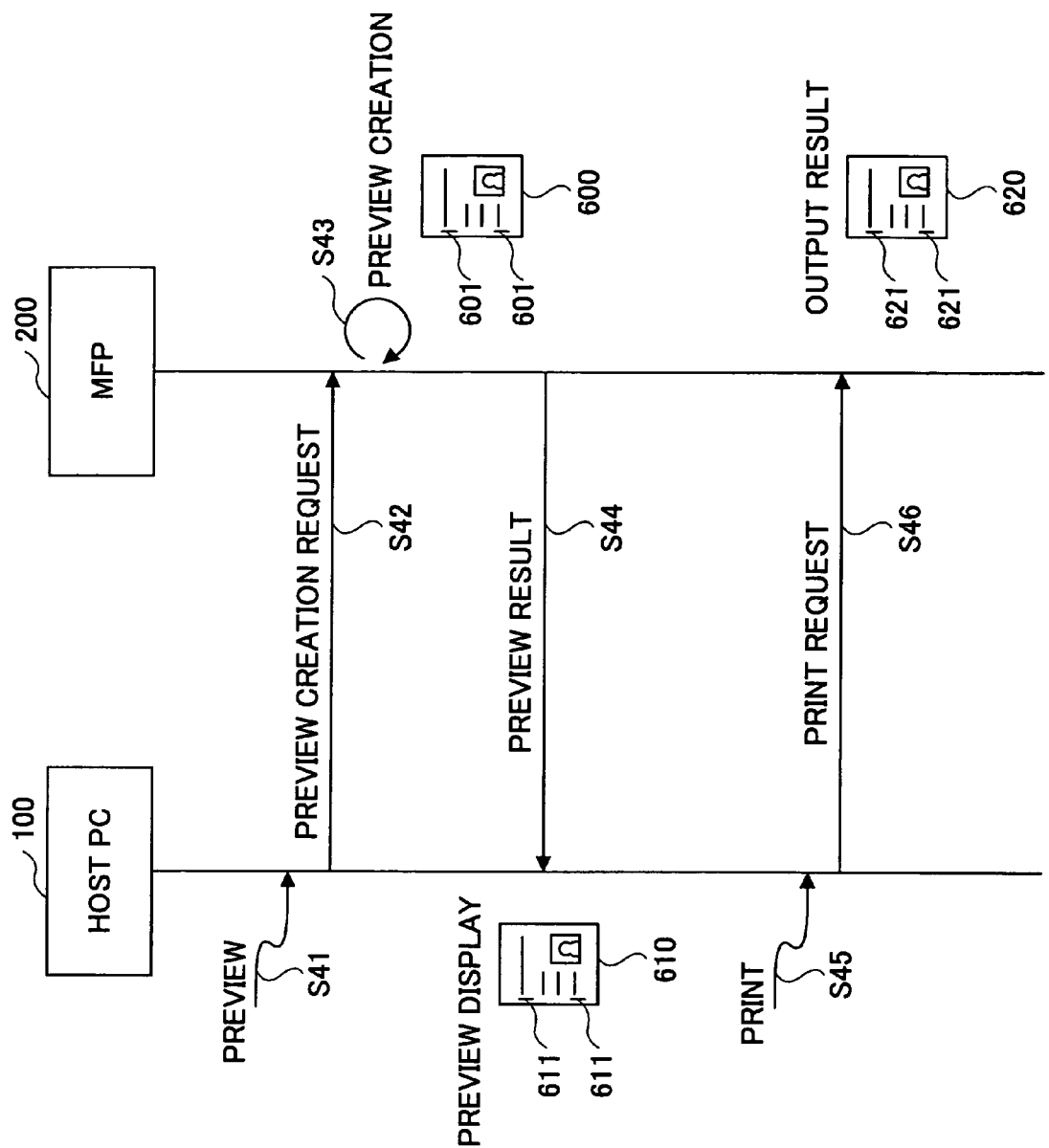
FIG. 6 is a sequence chart of a process by the image processing system according to the present invention.

A description will be given below, with reference to FIG. 6, of a process of printing after a preview image is displayed in the image processing system according to the present invention. FIG. 6 is a sequence chart of a process performed by the image processing system according to the present invention.

In step S41, the host PC 100 receives a preview image display request from an operator. Then, in step S42, the host PC 100 sends a preview creation request to the MFP 200. Then, the process proceeds to step S43 where the MFP 200 creates a preview image 600 from print data. The preview image 600 expresses that the printed matters are bound by staples 601 at two positions.

Then, in step S44, the MFP 200 sends the preview image as a preview result to the host PC 100. The host PC 100 displays the preview image 610. The preview image 610 is identical to the preview image 600, and expresses that the printed matter is bound byte staples 611 at two positions.

The operator checks the displayed preview image 610. If there is no problem in the preview image 610, the operator makes, in step S45, a print request. Then, the process proceeds to step S46 where the host PC 100 sends the print request to the MFP 200.

The MFP 200 carries out printing based on the print request from the host PC 100, and outputs the printed matter 620 as an output result. The printed matter 620 is bound by the staples 621 at two positions.

Thus, since two staples 621 of the printed matter 620 are expressed as the staples 601 in the preview image 600 in the image processing system according to the present invention, it can be determined from the preview image 600 whether or not the staples 601 overlap characters. Additionally, in the image processing system according to the present invention, a relationship between the orientation of the printed matter 620 and the staples 621 can be checked.

That is, in the image processing system according to the present invention, a relationship between an orientation of the output result and the staple positions or punch positions or whether or not the staples or punch holes overlap characters can be checked before printing since the finished image considering not only the output result according to the printing function but also the finish according to functions other than the printing function (for example, a stapling function or a punching function).

Furthermore, for the sake of easy understanding of the present invention, a description will be given below, with reference to FIG. 7, of a process of intensive printing after a preview image is displayed in an image processing system different from the image processing system according to the present invention.

Figure 7:
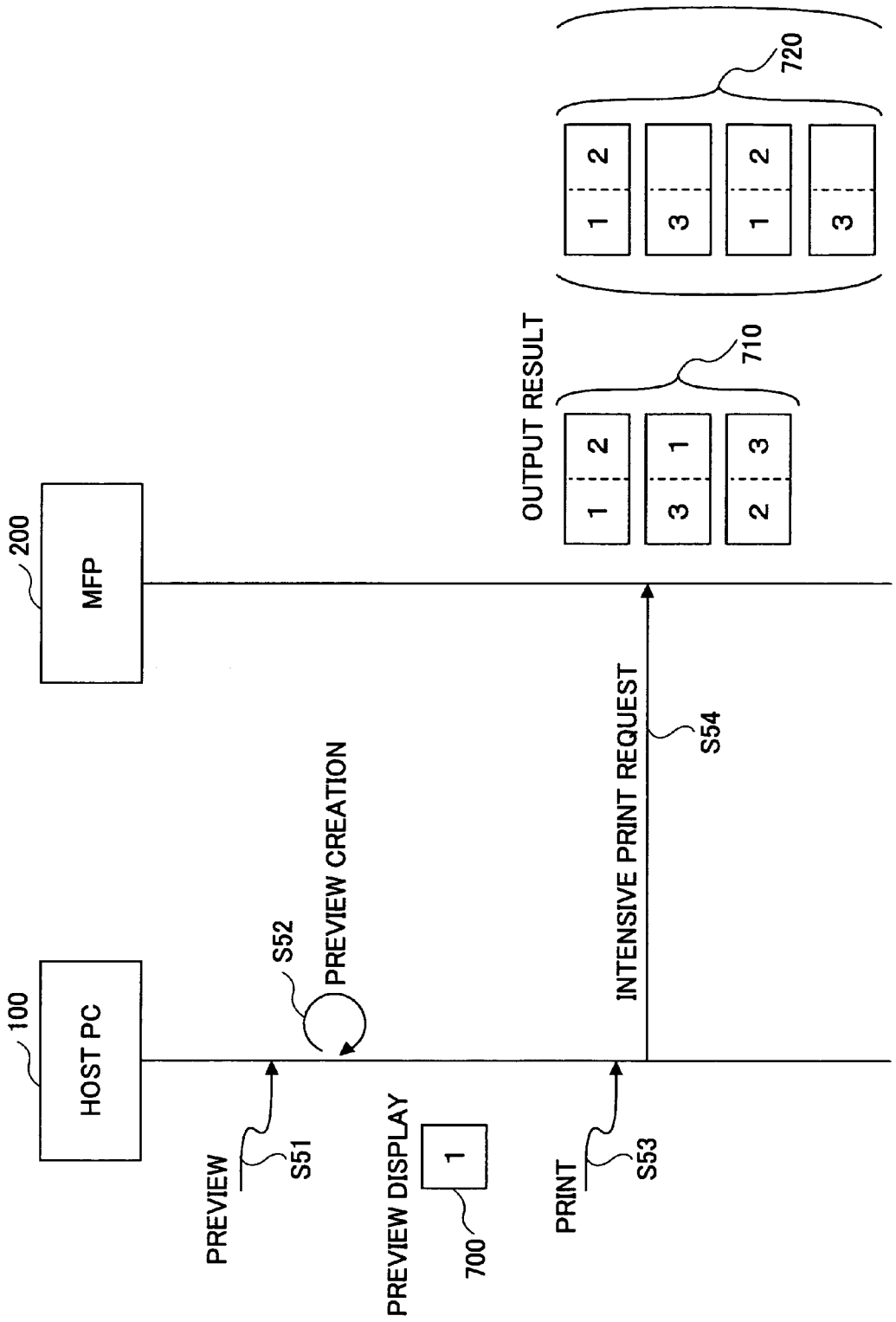
FIG. 7 is a sequence chart of a process by an image processing system different from the image processing system according to the present invention.

FIG. 7 is a sequence chart of a process performed by an image processing system different from the image processing system according to the present invention. In step S51, the host PC 100 receives the preview image display request from an operator. In step S52, the host PC 100 creates a preview image 700 from print data. Then, the host PC 100 displays the preview image 700.

The operator checks the displayed preview image 700. However, although the output result based on the print data can be checked by the preview image 700, an intensive output result cannot be checked. Here, an example will be described in which the operator desires an output of printed matter 720.

If there is no problem in the range which can be checked by the preview image 700, the operator makes, in step S53, an intensive print request. In step S54, the host PC 100 sends the intensive print request to the MFP 200.

The MFP 200 carries out printing based on the intensive print request from the host PC 100, and outputs printed matter 710 as an output result. The printed matter 710 differs from the printed matter 720 which the operator desires to have.

Thus, in the image processing system performing the process shown in FIG. 7, the appearance of the printed matter 710 as a result of the intensive output is not expressed in the preview image 700, and it cannot determine a failure in the intensive printing from the preview image 700. Additionally, in the image processing system performing the process shown in FIG. 7, it is difficult to check a finish of staples or punch holes from the preview image 700.

Figure 8:
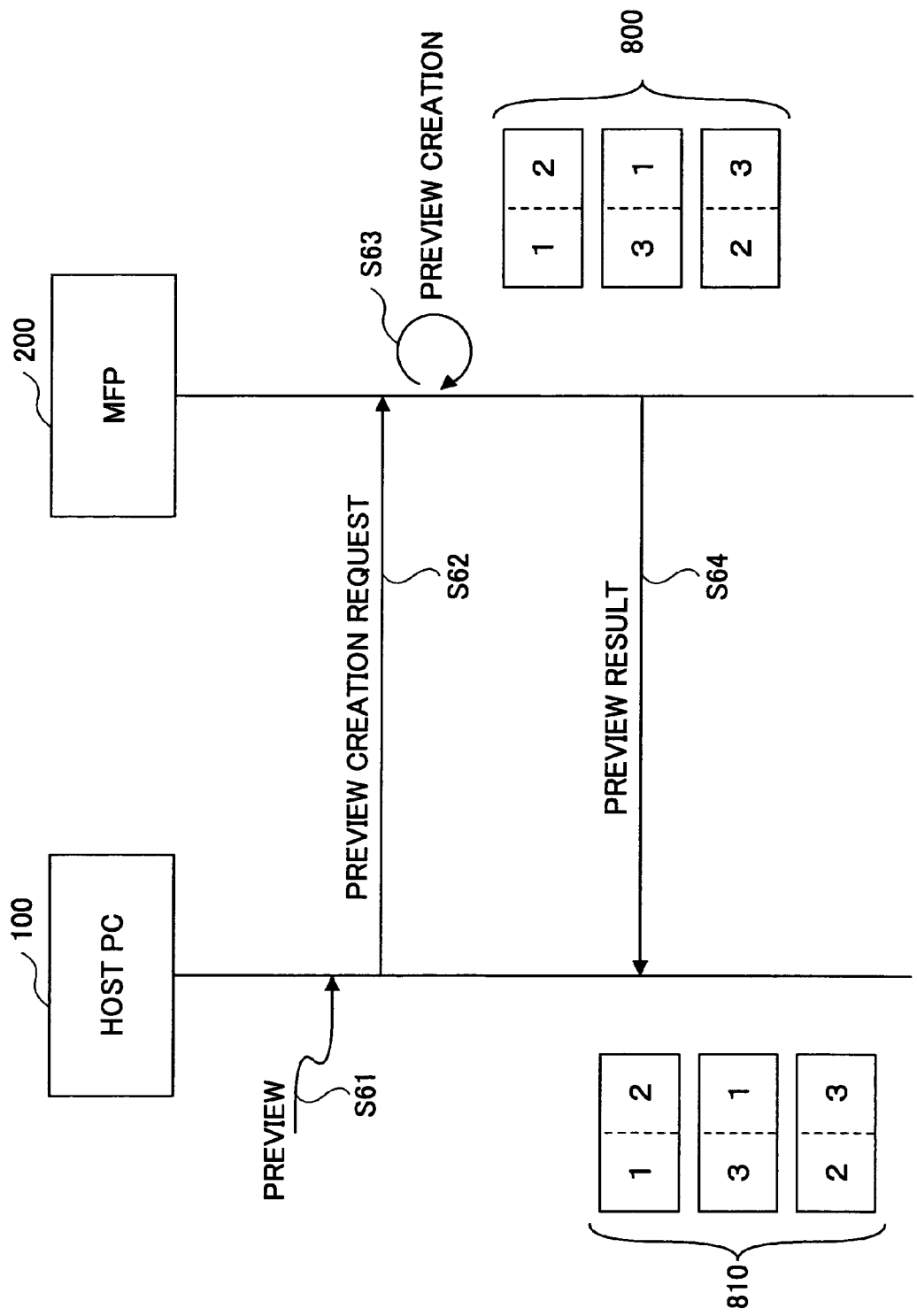
FIG. 8 is a sequence chart of a process by the image processing system according to the present invention.

A description will now be given, with reference to FIG. 8, of a process of intensive printing performed after a preview image is displayed in the image processing system according to the present invention. FIG. 8 is a sequence chart of a process performed in the image processing system according to the present invention.

In step S61, a host PC 100 receives a preview image display request from an operator. In step S62, the host PC 100 sends a preview creation request to the MFP 200. Then, the process proceeds to step S63 where the MFP 200 creates a preview image 800 from print data. The preview image 800 expresses the appearance of the intensive output result. In the image processing system according to the present invention, the preview image 800 accurately expressing the appearance of the intensive output result can be created since the preview image 800 is created by the MFP 200.

Then, the process proceeds to step S64 where the MFP 200 sends the preview image 800 to the host PC 100 as a preview result. Then, the host PC 100 displays the preview image 810. The preview image 810 is identical to the preview image 800, and expresses the appearance of the intensive output result.

For example, when the operator desires an output of the printed matter 720 shown in FIG. 7, the operator checks the preview image 810 which shows the appearance of the intensive output result so as to determine a failure occurring in the intensive printing easily. Thus, in the image processing system according to the present invention, the determination of occurrence of a failure in the intensive printing due to, for example, a setting error can be made since an appearance of the intensive output result is expressed in the preview image 810.

That is, in the image processing system according to the present invention, a failure in the intensive printing due to a setting error can be checked before printing since the intensive output result of the intensive printing in which an image processing is performed in the MFP 200 can be displayed as the preview image 810.

Figure 9:
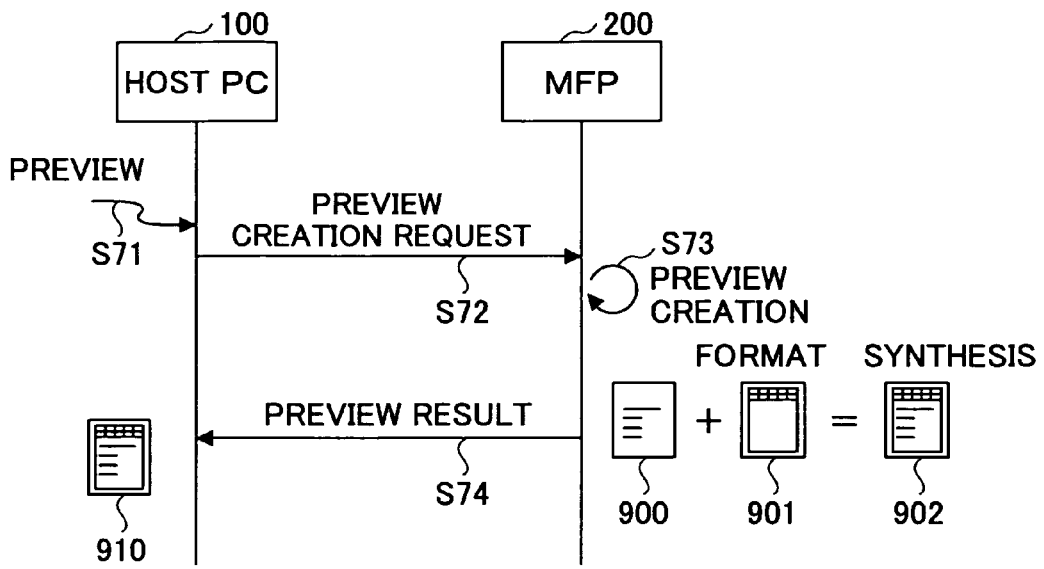
FIG. 9 is a sequence chart of a process by the image processing system according to the present invention.

A description will be given below, with reference to FIG. 9, of a process of displaying a preview image which is formed by synthesizing print data and a format for synthesis retained by the MFP 200 in the image processing system according to the present invention. FIG. 9 is a sequence chart of a process performed in the image processing system according to the present invention.

In step S71, the host PC 100 receives a preview image display request from the operator. In step S72, the host PC 100 sends a preview creation request to the MFP 200. Then, the process proceeds to step S73 where the MFP 200 creates a preview image 902 by synthesizing an image 900 according to the print data and a format 900 for synthesis stored in the MFP 200. In the image processing system according to the present invention, a preview image 902, which is a result of synthesis of the image 900 according to the print data and the format 901 for synthesis stored in the MFP 200, can be created since the preview image 902 is created by the MFP 200.

Then, the process proceeds to step S74 where the MFP 200 sends the preview image 902 to the host PC 100 as a preview result. The host PC 100 displays a preview image 910. The preview image 910 is identical to the preview image 902, and expresses an appearance of the output result in which the image 900 according to the print data and the format 901 for synthesis stored in the MFP 200 are synthesized.

Thus, in the image processing system according to the present invention, the appearance of the output result in which the image 900 according to the print data and the format 901 for synthesis stored in the MFP 200 are synthesized can be checked since the appearance of the output result in which the image 900 according to the print data and the format 901 for synthesis stored in the MFP 200 are synthesized is expressed in the preview image 910.

That is, in the image processing system according to the present invention, the output result of the synthesis printing can be checked before printing since the output result according to the synthesis printing in which an image processing is performed in the MFP 200 can be displayed as the preview image 910.

Figure 10:
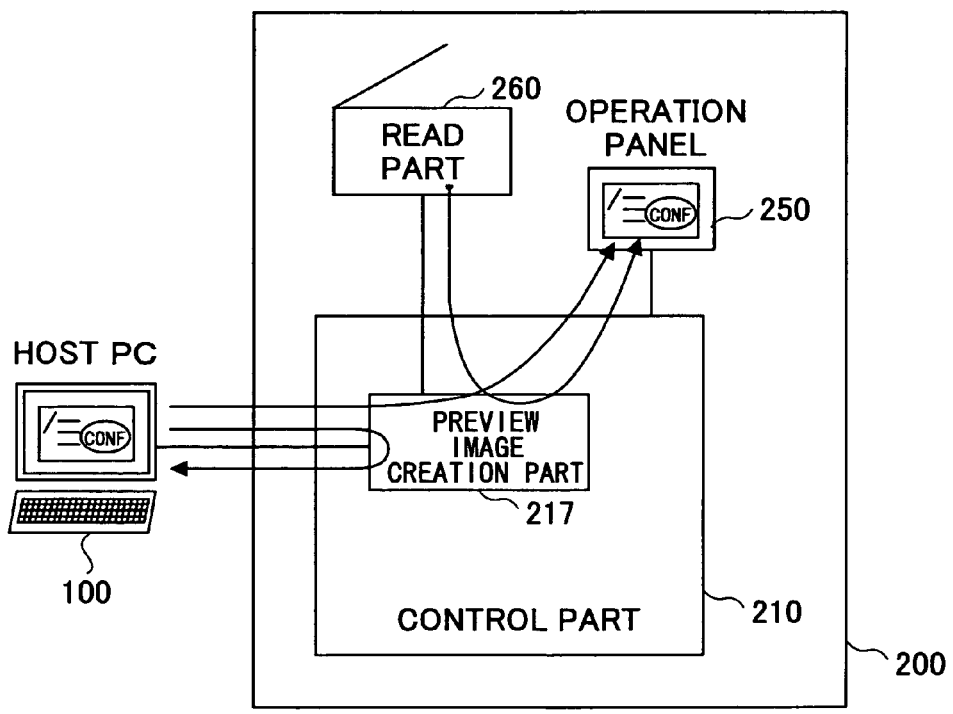
FIG. 10 is an illustration for explaining an example expressing a feature of the image processing system according to the present invention which unifies creation of preview images.

A description will now be given, with reference to FIG. 10, of a feature of the image processing system of the present invention which unifies creation of preview images. FIG. 10 is an illustration for explaining a feature of the image processing system according to the present invention which unifies creation of a preview image.

In the image processing system according to the present invention, the preview image creation part 217 is provided to the control part 210 of the MFP 200. Thus, in the image processing system according to the present invention, the same preview image can be achieved irrespective of the input means such as the host PC or the read part 260 by unifying the preview image creation part 217. Additionally, the MFP 200 according to the present invention can display the preview image, which is created in accordance with the preview creation request from the host PC 100, on the operation panel 250 of its own.

Figure 11:
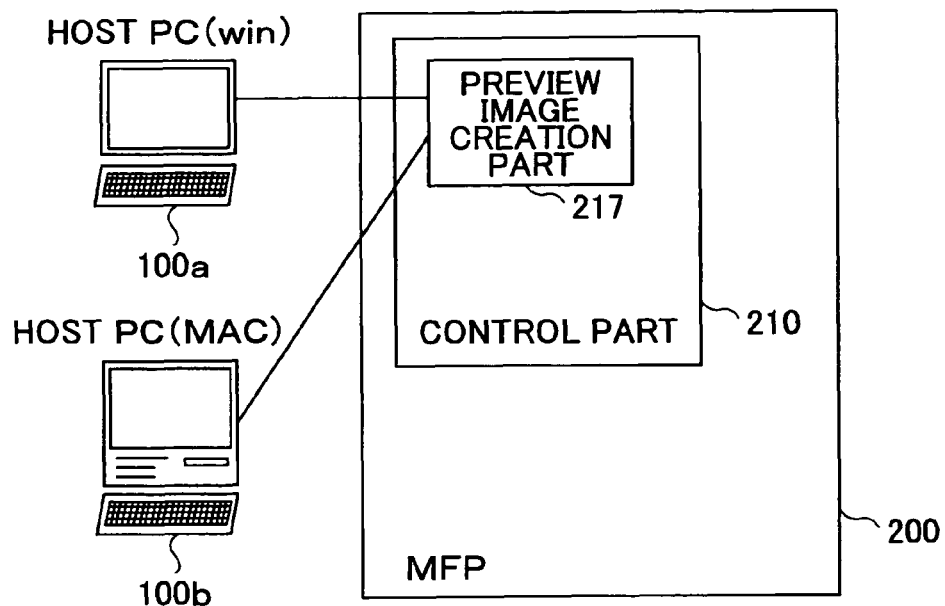
FIG. 11 is an illustration for explaining another example expressing a feature of the image processing system according to the present invention which unifies creation of preview images.

FIG. 11 is an illustration for explaining a feature of the image processing system according to the present invention which unifies creation of a preview image. In the image processing system according to the present invention, similar to FIG. 10, the preview image creation part 217 is provided to the control part 210 of the MFP 200. Thus, in the image processing system according to the present invention, a difference between operating systems of a host PCs 100a and 100b can be absorbed by unifying the preview image creation part 217.

For example, as an example in which a difference exists in the operating system, there is a case where the host PC 100a uses Windows (registered trademark) and the host PC 100 uses MAC (registered trademark). Accordingly, in the image processing system according to the present invention, a difference between the host PCs 100a and 100b can be eliminated by unifying the preview image creation part 217 so as to achieve the same preview image.

Figure 12:
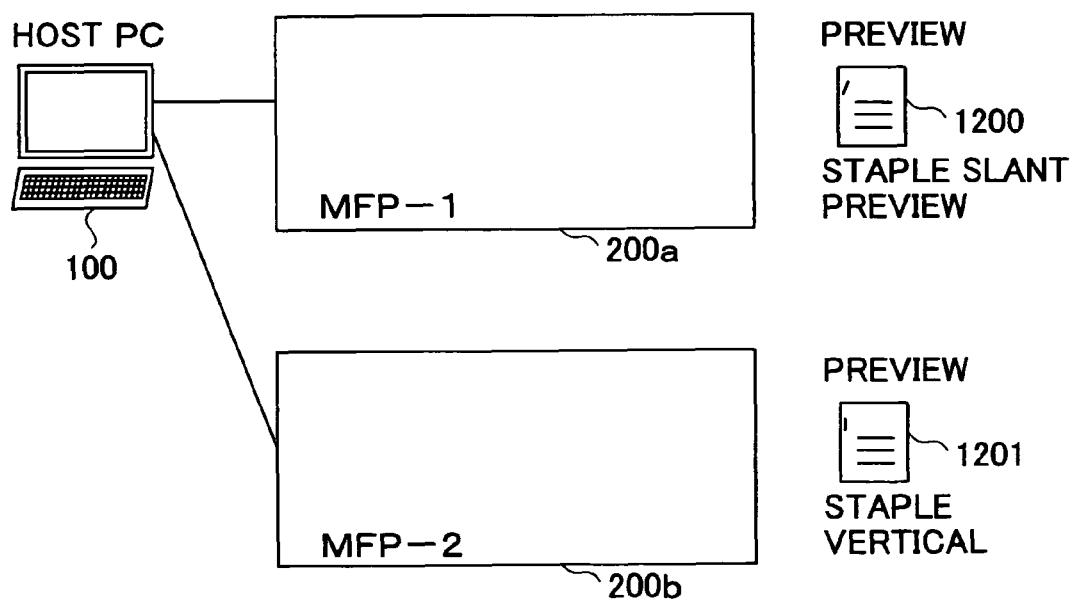
FIG. 12 is an illustration for explaining an example expressing a feature of the image processing system according to the present invention which unifies creation of preview images on an individual MFP basis.

A description will now be given, with reference to FIG. 12, of a feature of the image processing system according to the present invention, which unifies creation of a preview image for each MFP 200. FIG. 12 is an illustration for explaining a feature of the image processing system according to the present invention, which unifies creation of a preview image for each MFP.

In the image processing system according to the present invention, a difference peculiar to equipments between MFPs 200a and 200b, such as, for example, an orientation of a staple, is absorbed by unifying creation of a preview image for each of the MFPs 200a and 200b. For example, the MFP 200a creates a preview image 1200 in which a staple extends in a slanting direction. On the other hand, the MFP 200b creates a preview image in which a staple extends in a vertical direction. Accordingly, in the image processing system according to the present invention, a preview image corresponding to the difference peculiar to each equipment of the MFPs 200a and 200b can be achieved by unifying creation of the preview image for each MFP.

Figure 13:
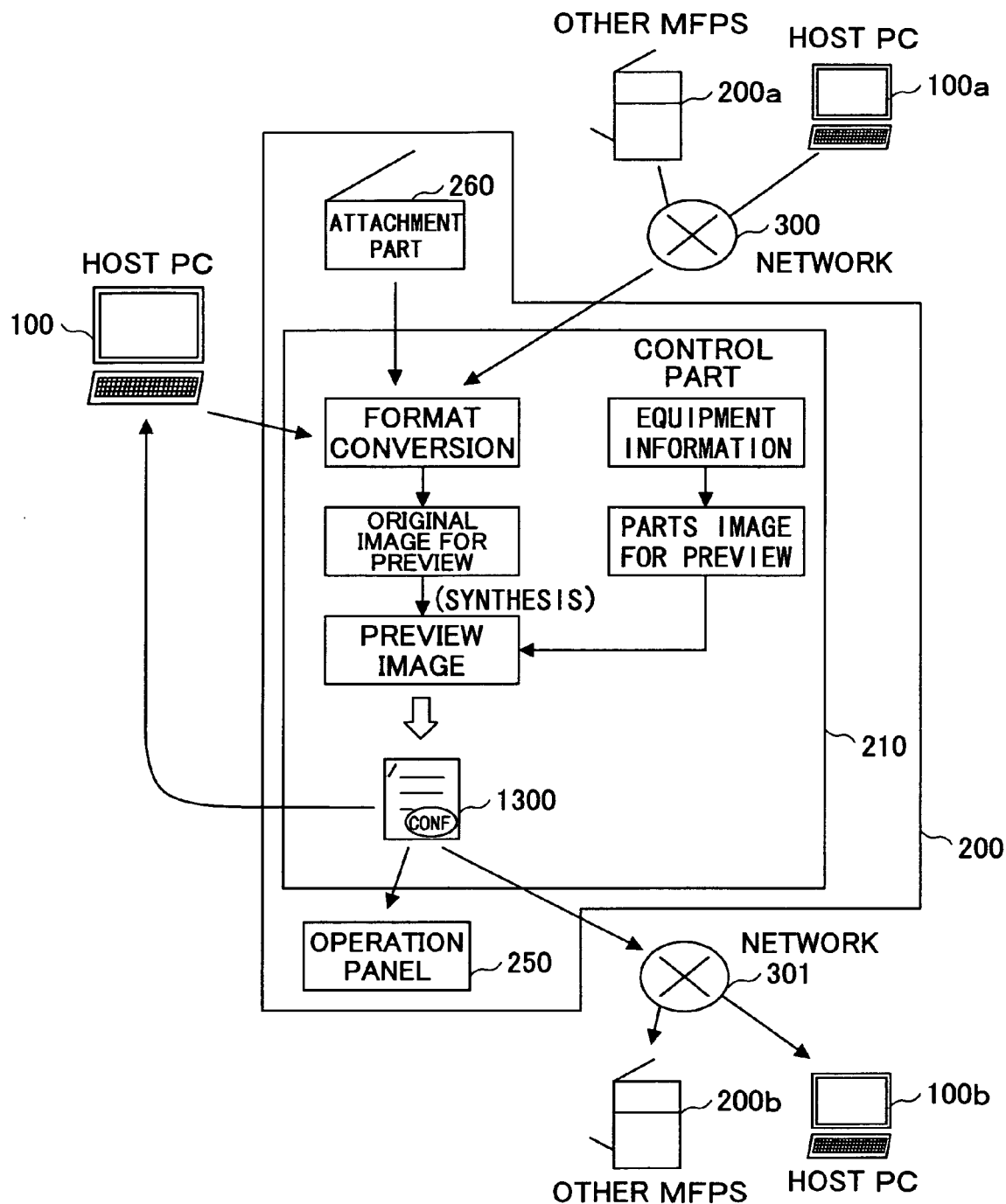
FIG. 13 is an illustration for explaining an example expressing a feature of the image processing system according to the present invention which creates a finished image as a preview image considering not only an output result by a printing function but also a finish according to a function other than a printing function.

A description will now be given, with reference to FIG. 13, of a feature of the image processing system according to the present invention, which creates a finished image considering not only an output result according to a printing function but also a finish according to a function other than a printing function FIG. 13 is an illustration for explaining a feature of the image processing system according to the present invention, which creates a finished image considering not only an output result according to a printing function but also a function other than the printing function, as a preview image.

Print data or read data from the host PC 100, the read part 260, another host PC 100a connected via the network 300, and the MFP 200a are supplied to the format conversion part 213, and is converted into a unified format. Then, a preview original-image creation part 221 creates an original image for preview from the print data or the read data, which has been converted into a unified format.

Moreover, the preview parts-image creation part 222 acquires equipment information such as, for example, staple information 271 of the print part 270 so as to create a parts image for review. It should be noted that the parts-image for preview is an image expressed as a finished image corresponding to a staple, a punch hole, a format of synthesis, a stamp, etc.

The preview image synthesis part 223 creates a preview image 1300 by synthesizing the original image for preview created by the preview original-image creation part 221 and a parts image for preview created by the preview parts-image creation part 222.

Thus, in the image processing system according to the present invention, the same preview image 1300 can be displayed on any of the host PC 100, the operation panel 250, the host PC 100b connected via the network 300 and the MFP 200b by unitarily performing creation of the preview image 1300 by the MFP 200.

Moreover, in the image processing system according to the present invention, a preview image in which a part peculiar to each equipment (for example, an orientation of a staple) is expressed accurately, can be created by unitarily performing creation of the preview image 1300 by the MFP 200.

Figure 14:
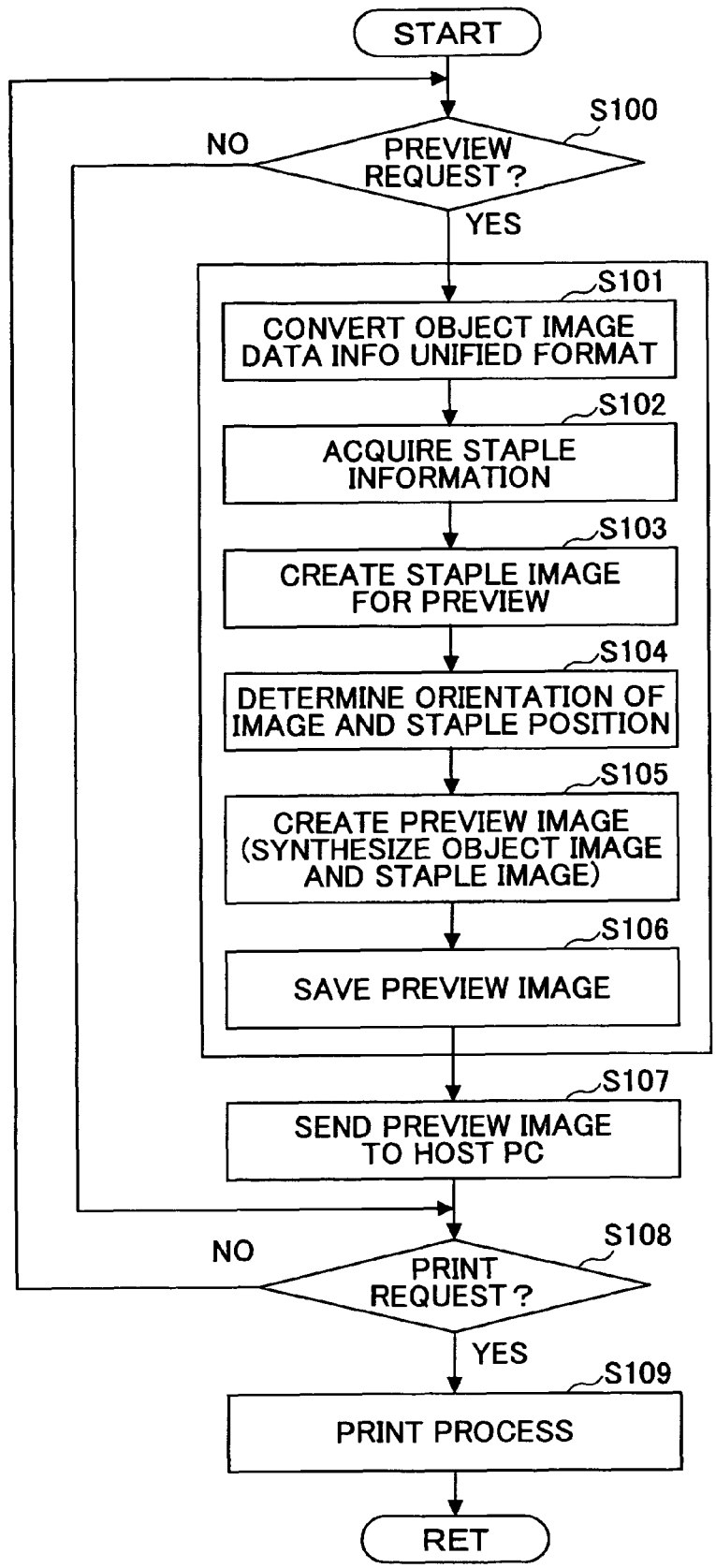
FIG. 14 is a flowchart of a process based on a preview image display request from a host PC.

FIG. 14 is a flowchart of a process based on the preview image display request from the host PC. In step S100, the preview image creation part 217 determined whether a preview image display request has been sent from the host PC 100. If there is the preview image display request sent from the host PC 100, the process proceeds to step S101 where the preview image creation part 217 converts print data or read data corresponding to the preview display request into unified format data by using the format conversion part 213. The preview original-image creation part 221 creates an original image for preview from the printed data or the read data, which has been converted into the unified format data.

Then, in step S102, the preview parts-image creation part 222 acquires staple information 271 from, for example, the print part 270. Then, in step S103, the preview parts-image creation part 222 creates a parts-image for preview from the acquired staple information.

Then, in step S104, the preview image synthesis part 223 determines an orientation of the original image for preview and a position of the parts-image for preview. Then, the process proceeds to step S105 where the preview image synthesis part 223 creates a preview image by synthesizing the original image for preview and the parts-image for preview.

Then, the process proceeds to step S106 where the preview image synthesis part 223 saves the preview image in the preview image retain part 224. Then, in step S107, the preview image creation part 217 sends the preview image saved in the preview image retain part 224 to the host PC 100, and the process proceeds to step S108. Additionally, if there is no preview image display request from the host PC 100 in step S100, the process proceeds to step S108.

In step S108, the control part 210 judges existence of the print request from the host PC 100. If there is no print request, the control part 210 continues the return process to the process of step S100. If there is the print request, the control part 210 performs the printing process of step S109. After the process of step S109 is completed, the process returns to step S100.

Therefore, in the image processing system according to the present invention, the process based on the print request is performed upon checking whether or not a relationship between a staple position and a direction of an output result or whether or not a staple overlaps characters since the finished image can be displayed as the preview image.

Figure 15:
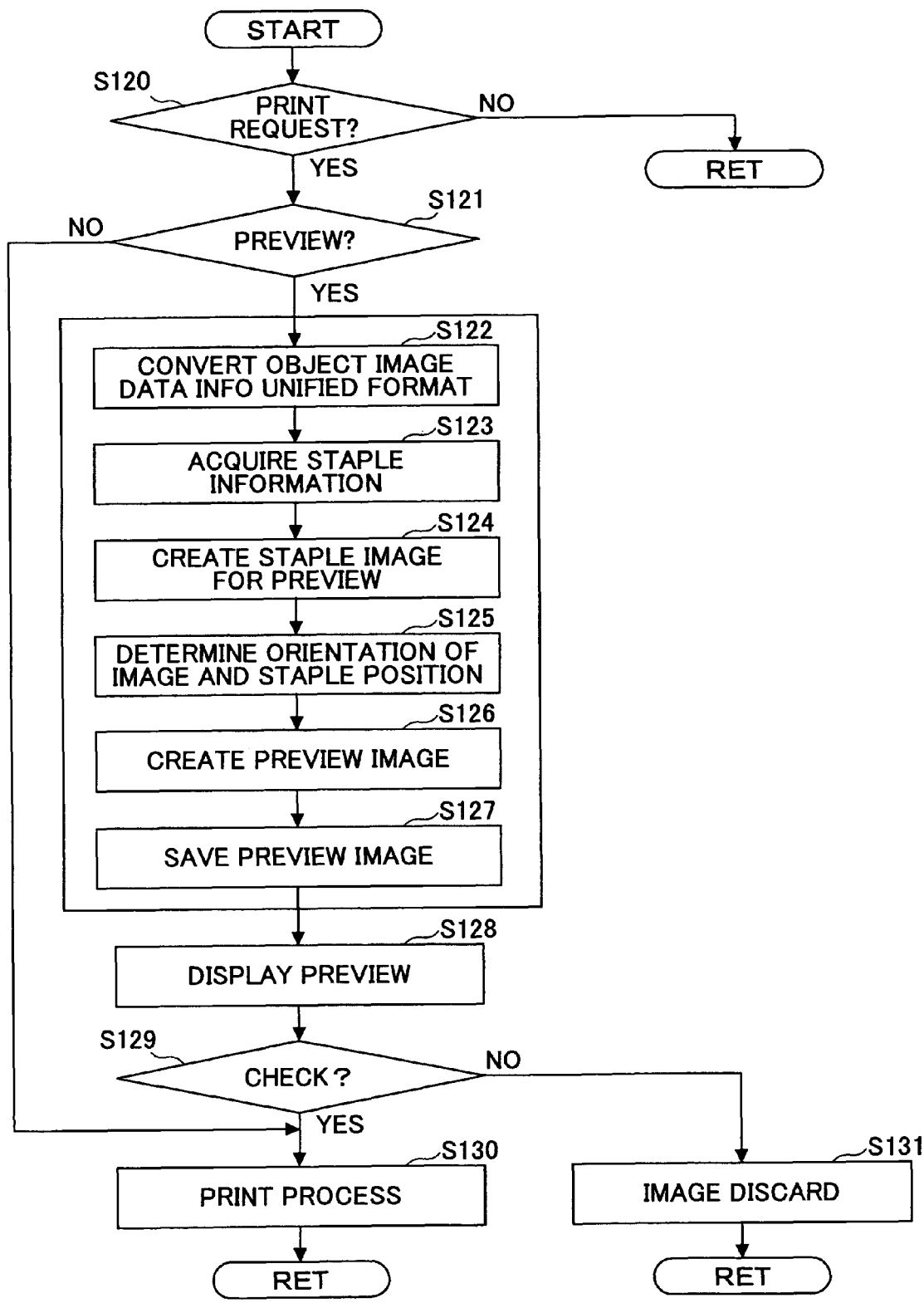
FIG. 15 is a flowchart of a process based on a print request from an operation panel.

FIG. 15 is a flowchart of a process based on a print request from the operation panel of its own. In step S120, the preview image creation part 217 determined whether or not there has been a print request sent from the operation panel of its own. If there is the print request from the operation panel 250, the process proceeds to step S121 where the preview image creation part 217 determines whether or not it is set to perform a preview.

If it is set to perform a preview, the process proceeds to step S122 where the preview image creation part 217 converts print data or read data corresponding to the preview image display request into unified format data by using the format conversion part 213. Additionally, the preview original-image creation part 221 creates an original image for preview from the print data or the read data, which has been converted into the unified format data.

Then, in step S123, the preview parts-image creation part 222 acquires staple information 271 from, for example, the print part 270. Then, in step S124, the preview parts-image creation part 222 creates a parts-image for preview from the acquired staple information.

Then, in step S125, the preview image synthesis part 223 determines an orientation of the original image for preview and a position of the parts-image for preview. Then, the process proceeds to step S126 where the preview image synthesis part 223 creates a preview image by synthesizing the original image for preview and the parts-image for preview. Then, the process proceeds to step S127 where the preview image synthesis part 223 saves the preview image in the preview image retain part 224.

Then, in step S128, the control part 210 displays the preview image, which is saved in the preview image retain part 224, on the operation panel. If there is no problem in the preview image, the operator inputs "check OK" through, for example, the operation panel 250. If the "check OK" is input through the operation panel 250, the control part 210 performs the print process of step S130. Additionally, if it is set to not perform a preview in step S121, the control part 210 performs the print process of step S130. It should be noted that the process returns to step S120 after the process of steps S130 and S131 is completed.

On the other hand, if there is a problem in the preview image, the operator inputs "check NG" through, for example, the operation panel 250. If the "check NG" is input through the operation panel 250, the process proceeds to step S131 where the control part 210 discards the image and the preview image corresponding to the print request. It should be noted that the process returns to step S120 if there is no print request from the operation panel 250 in step S120.

Figure 16:
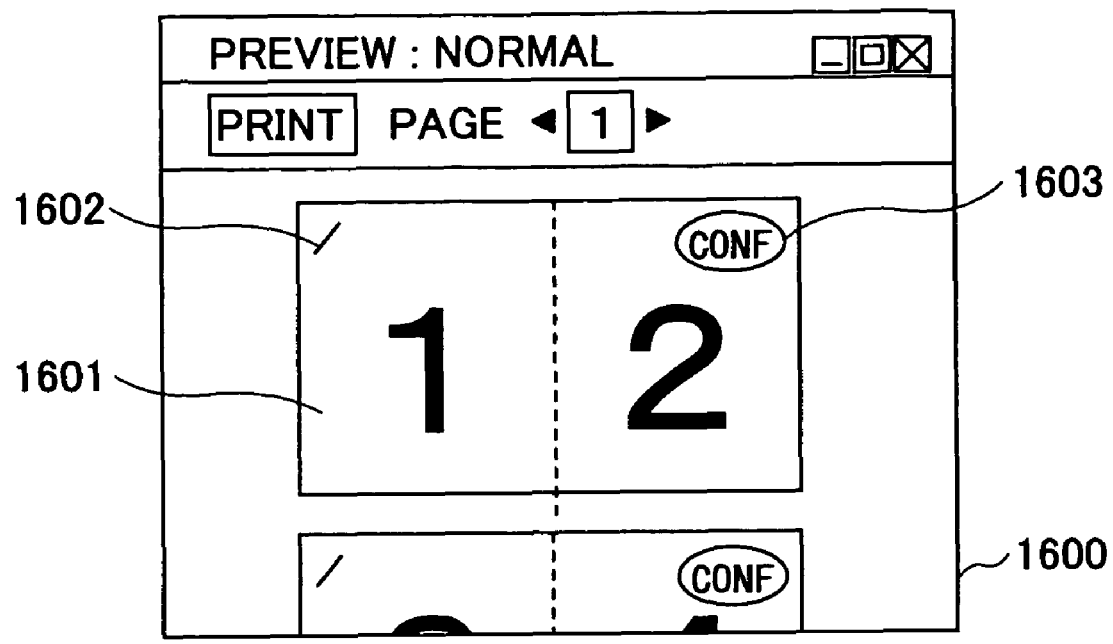
FIG. 16 is an illustration of a preview image according to the present invention.

FIG. 16 is an illustration of an example of the preview image according to the present invention. The preview image 1600 shown in FIG. 16 is created by synthesizing an original image 1601 of intensive printing for preview, a parts image 1602 for preview of a staple, and a parts image 1603 for preview of a stamp. The preview image 1600 expresses not only an output result according to a printing function but also a finished image considering finish according to a function other than the printing function.

Figure 17:
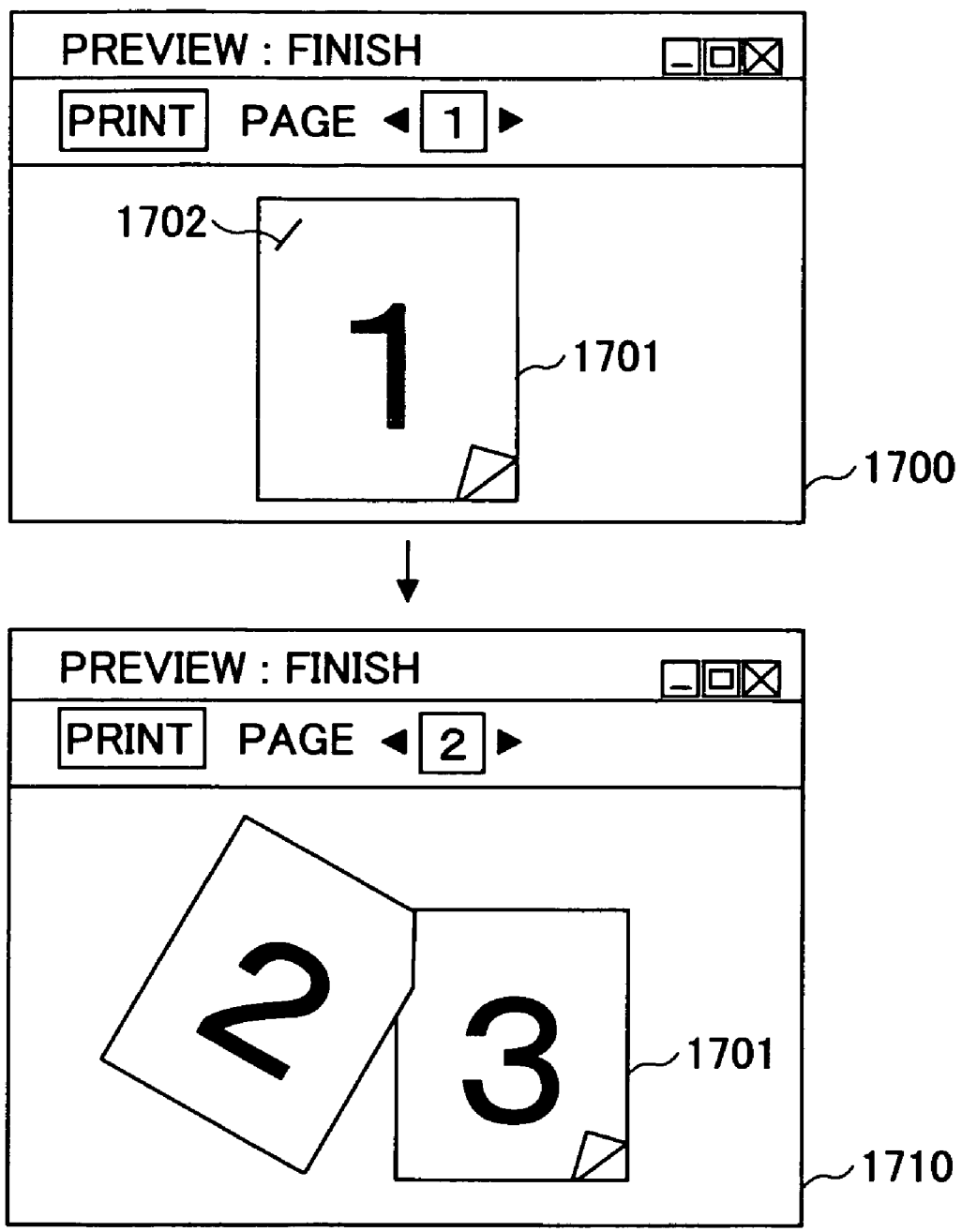
FIG. 17 is an illustration of another preview image according to the present invention.

FIG. 17 is an illustration of another example of the preview image according to the present invention. The preview image 1700 shown in FIG. 17 is created by synthesizing an original image 1701 for preview of both-sides printing and a parts image 1702 for preview of a staple. When a next page is designated in the preview image 1700 of FIG. 17, the host PC 100, for example, displays a preview image 1710 on the display part 101. The preview images 1700 ad 1710 express not only an output result according to a printing function but also a finished image considering finish according to a function other than the printing function.

In the image processing system according to the present invention, if a relationship between an output result and a position of the staple in the preview image is not what intended to, the relationship between the output result and the staple position can be adjusted as follows.

Figure 18:
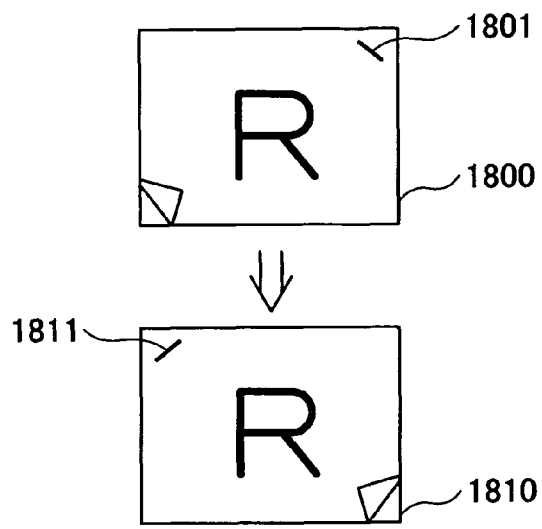
FIG. 18 is an illustration showing a relationship between a staple position and a direction of an output result of a preview image.

FIG. 18 is an illustration showing a relationship between the output result and the staple position. A preview image 1800 of FIG. 18 is an example of failure in stapling because a staple 1801 is located at a position which the operator does not intend to. A preview image 1810 is an example of success in stapling because a staple 1811 is located at a position which the operator intends to.

The failure in stapling in the preview image 1800 occurs due to incorrect determination of the direction of the output result. Thus, in the MFP 200 according to the present invention, by enabling a designation of an orientation of an original document set in an automatic document feeder (ADF), the preview image 1800 in which a failure occurs in stapling can be adjusted to the preview image 1810 in which stapling is succeeded.

Figure 19A:
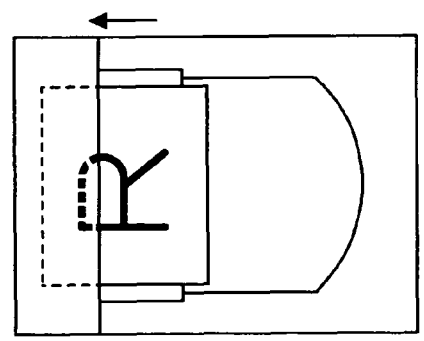
FIGS. 19A and 19B are illustrations showing orientations of an original document set in an ADF.
Figure 19B:
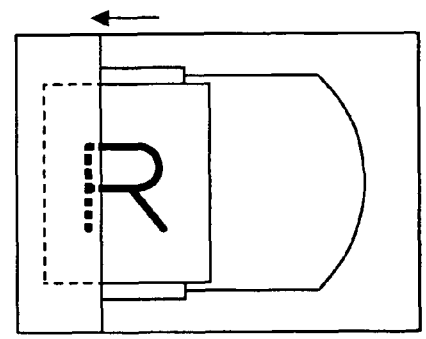
Figure 20:
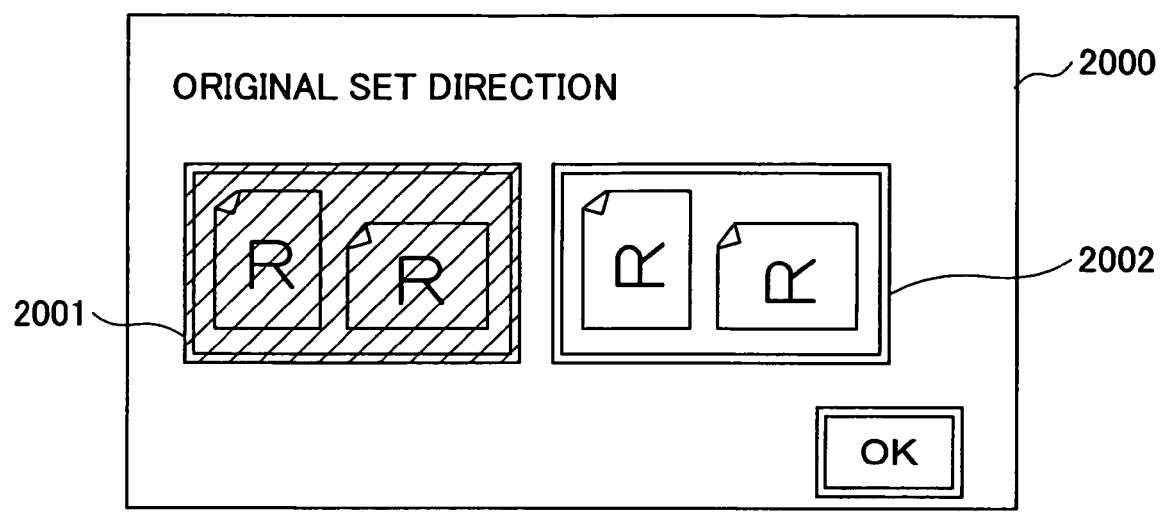
FIG. 20 is an illustration of a screen for designating an orientation of an original document set in an ADF.

FIGS. 19A and 19B are illustrations showing orientations of an original document set in the ADF. FIG. 20 is an illustration of a screen for designating an orientation of an original document set in the ADF. When an original document is set in the ADF as shown in FIG. 19A, the operator should press a button 2002 in the screen 2000 shown in FIG. 20. On the other hand, when an original document is set in the ADF as shown in FIG. 19B, the operator should press a button 2001 in the screen 2000 shown in FIG. 20.

The present invention is not limited to the specifically disclosed embodiments, and variations and modifications may be made without departing from the scope of the present invention.

The present application is based on Japanese priority application No. 2005-303290 filed Oct. 18, 2005, the entire contents of which are hereby incorporated herein by reference.

What is claimed is:

1. A multifunction printing apparatus, comprising:
   a printer having a printing function to print an image to a medium;
   equipment including a finisher to perform a finishing function to the medium;
   a communication part that receives a preview creation request from an information processing apparatus connected to the multifunction printing apparatus through a network;
   a preview original-image creation part that creates, in response to the preview creation request, an original image for preview of the printing function to be performed by the printer to the medium based on print data received from the network;
   a preview parts-image creation part that creates a parts-image for preview peculiar to the finishing function of the equipment of the multifunction printing apparatus;

a preview image synthesis part that synthesizes a preview image from said original-image for preview and said parts-image for preview; and a preview image retaining part that retains the preview image, wherein the communication part transmits the preview image to the information processing apparatus through the network.

2. The multifunction printing apparatus as claimed in claim 1, wherein said preview parts-image creation part creates an image of the finisher performing the finishing function on the medium, other than said printing function, which is the parts-image for preview peculiar to the equipment.

3. The multifunction printing apparatus as claimed in claim 2, wherein said finisher is a stapler or a punch and said preview parts-image creation part renders an image of performing stapling or punching, respectively, to the medium.

4. The multifunction printing apparatus as claimed in claim 2, wherein said finisher is a formatter or a stamp and said preview parts-image creation part creates an image of performing formatting or stamping, respectively, to the medium.

5. The multifunction printing apparatus as claimed in claim 1, further comprising a format conversion part that converts a format of the print data supplied from different supply sources into a unified format.

6. The multifunction printing apparatus as claimed in claim 1, wherein the preview image retained by said preview image retaining part is displayed on a display part of said multifunction printing apparatus.

7. An image processing method of a multifunction printing apparatus including a printer having a printing function to print an image to a medium and equipment including a finisher to perform a finishing function to the medium, the method comprising:

receiving a preview creation request from an information processing apparatus through a network, by the multifunction printing apparatus;

creating an original image for preview, by the multifunction printing apparatus, based on print data included in the preview creation request;

creating a parts image for preview, by the multifunction printing apparatus, peculiar to the equipment of the multifunction printing apparatus;

synthesizing a preview image, by the multifunction printing apparatus, from the original image for preview and the parts image for preview;

retaining the preview image;

transmitting the preview image to the information processing apparatus through the network; and displaying, by the information processing apparatus, the preview image.

8. The image processing method as claimed in claim 7, wherein the step of creating a parts image for preview peculiar to the equipment creates an image of the finisher performing the finishing function to the medium, other than the printing function, which is the parts image for preview peculiar to the equipment.

9. The image processing method as claimed in claim 8, wherein said finisher is a stapler or a punch and said step of creating a parts image for preview peculiar to the equipment renders an image of performing stapling or punching, respectively, to the medium.

10. The image processing method as claimed in claim 8, wherein said finisher is a formatter or a stamp and said step of creating a parts image for preview creates an image of performing formatting or stamping, respectively, to the medium.

11. The image processing method as claimed in claim 7, further comprising a step of converting a format of the print data supplied from different supply sources into a unified format.

12. An image processing system comprising a multifunction printing apparatus and an information processing apparatus networked to said multifunction printing apparatus and making various requests to said multifunction printing apparatus, said multifunction printing apparatus including:

a printer having a printing function to print an image to a medium;

equipment including a finisher to perform a finishing function to the medium;

a communication part that receives a preview creation request from the information processing apparatus;

a preview original-image creation part that creates, in response to the preview creation request, an original image for preview of the printing function to be performed by the printer to the medium based on print data received from the information processing apparatus;

a preview parts-image creation part that creates a parts image for preview peculiar to the finishing function of the equipment of the multifunction printing apparatus;

a preview image synthesis part that synthesizes a preview image from said original image for preview and said parts image for preview; and a preview image retaining part that retains the preview image, the communication part transmitting the preview image to the information processing apparatus, and said information processing apparatus including a control part that requests the preview image from said multifunction printing apparatus, receives the preview image and displays the received preview image on a display part thereof.

13. The image processing system as claimed in claim 12, wherein said preview parts-image creation part creates an image of the finisher performing the finishing function to the medium, other than said printing function, which is the parts image for preview peculiar to the equipment.

14. The image processing system as claimed in claim 13, further comprising a format converting part that converts a format of the print data supplied from different supply sources into a unified format.

15. The image processing system as claimed in claim 13, wherein said finisher is a stapler or a punch and said preview parts-image creation part renders an image of performing stapling or punching, respectively, to the medium.

16. The image processing system as claimed in claim 13, wherein said finisher is a formatter or a stamp and said preview parts-image creation part creates an image of performing formatting or stamping, respectively, to the medium.

* * * * *